Sept. 21, 1937.  A. ZILLGER  2,093,769
PORTABLE SOUND-ON-FILM MOTION PICTURE PROJECTING APPARATUS
Filed Oct. 29, 1931  8 Sheets-Sheet 1

INVENTOR
ARNO ZILLGER
BY ATTORNEY
Braselton Whitcomb & Davies

Sept. 21, 1937.　　　　A. ZILLGER　　　　2,093,769
PORTABLE SOUND-ON-FILM MOTION PICTURE PROJECTING APPARATUS
Filed Oct. 29, 1931　　　8 Sheets-Sheet 2

INVENTOR
ARNO ZILLGER
BY ATTORNEY
Braselton Whitcomb & Davies

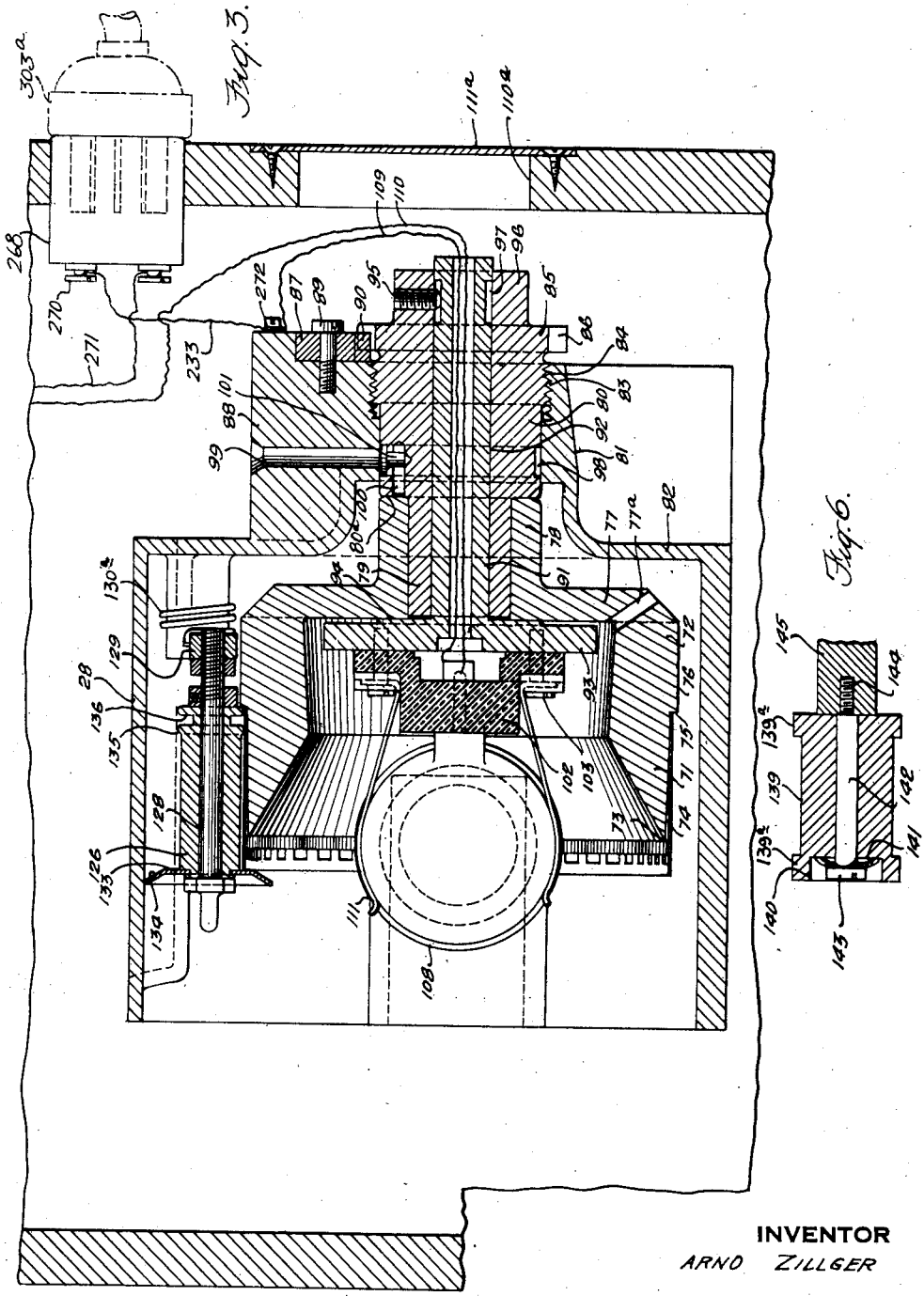

Sept. 21, 1937. A. ZILLGER 2,093,769
PORTABLE SOUND-ON-FILM MOTION PICTURE PROJECTING APPARATUS
Filed Oct. 29, 1931 8 Sheets-Sheet 4
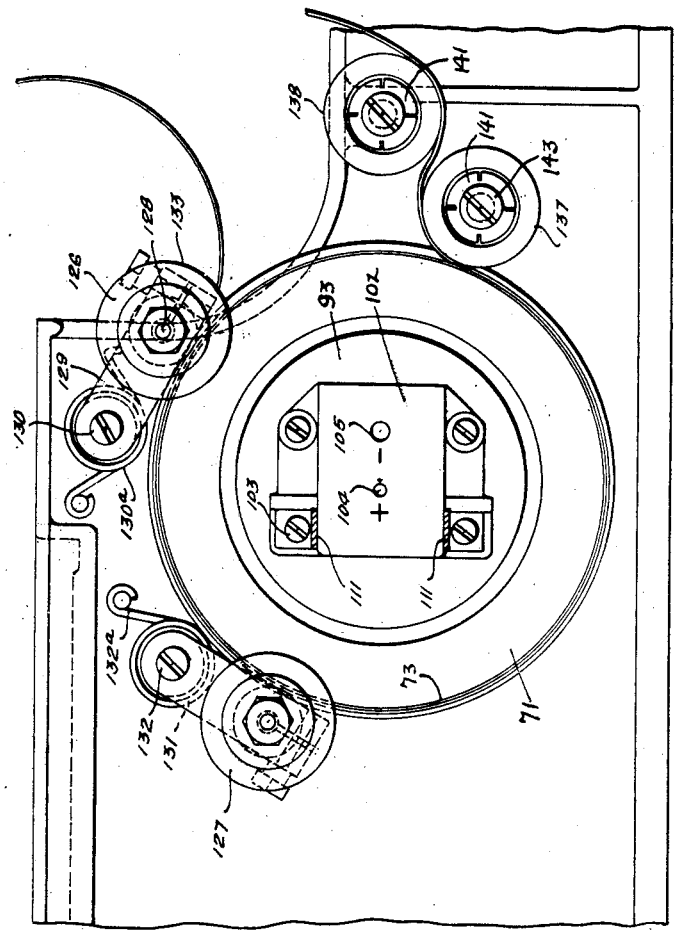
INVENTOR
ARNO ZILLGER
BY ATTORNEY

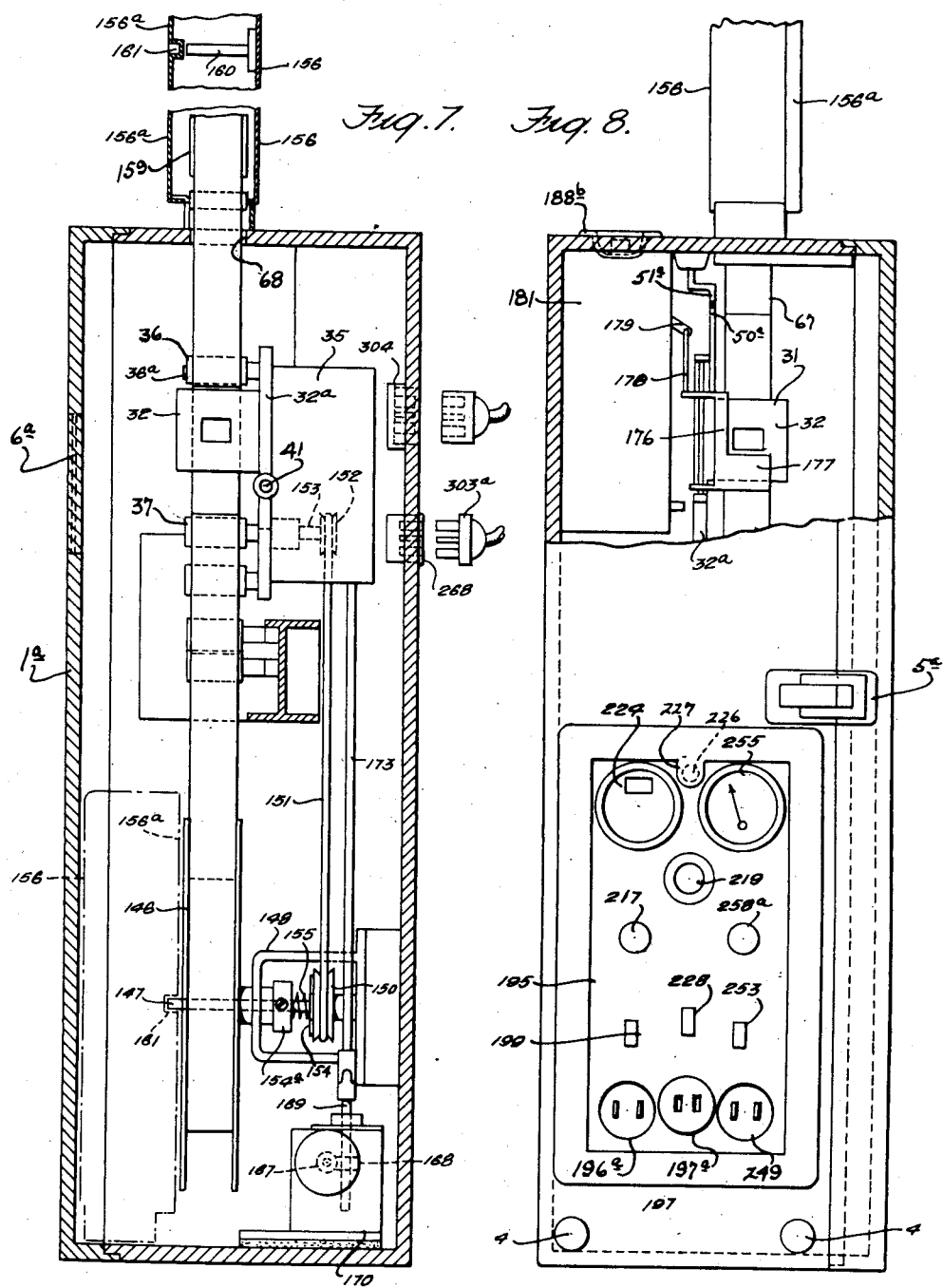

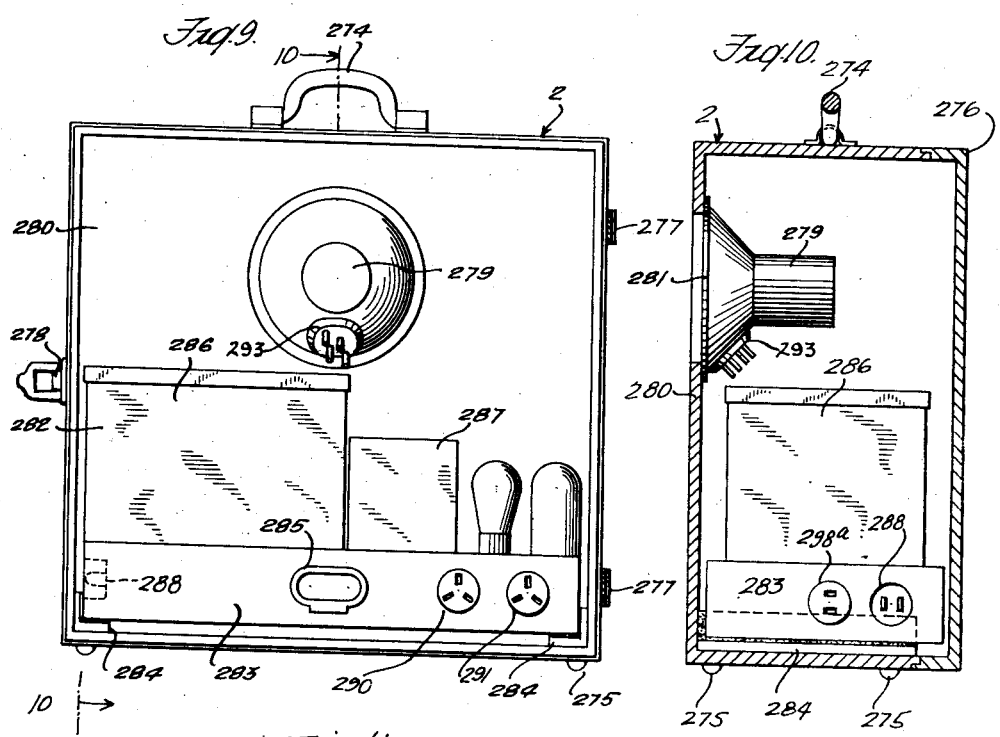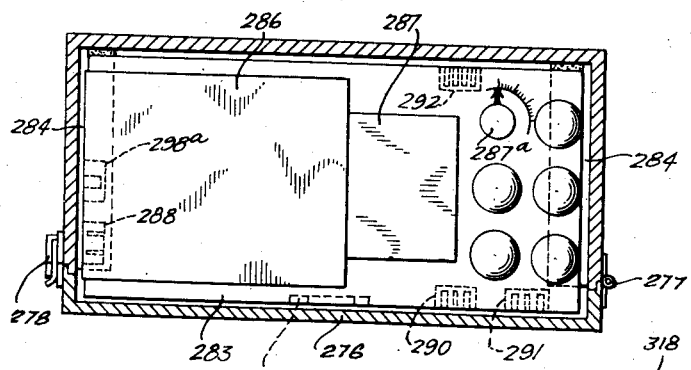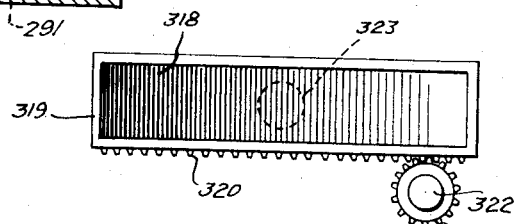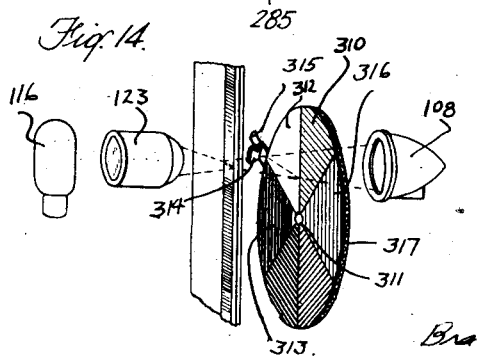

Sept. 21, 1937.  A. ZILLGER  2,093,769
PORTABLE SOUND-ON-FILM MOTION PICTURE PROJECTING APPARATUS
Filed Oct. 29, 1931  8 Sheets-Sheet 7
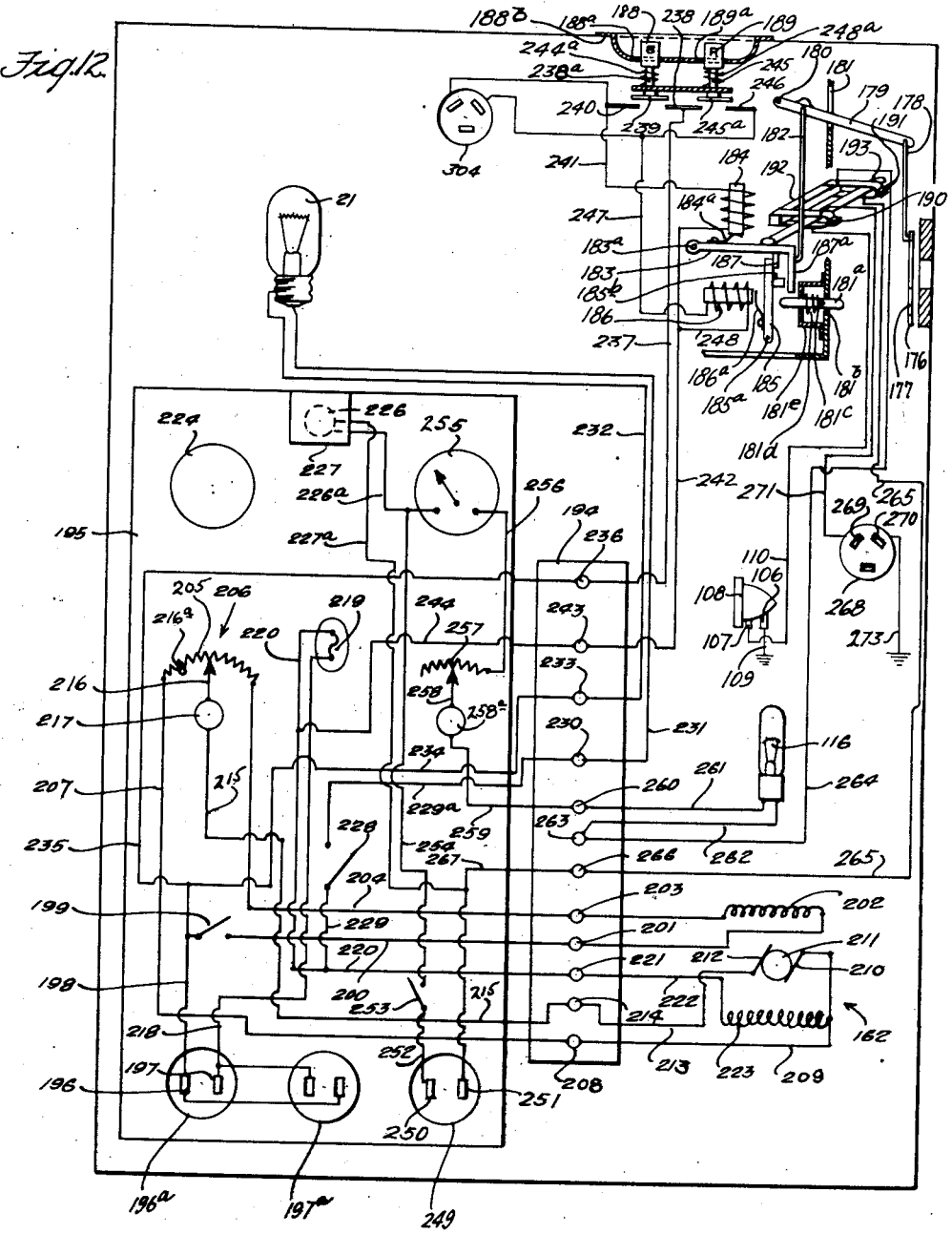
INVENTOR
ARNO ZILLGER
BY ATTORNEY

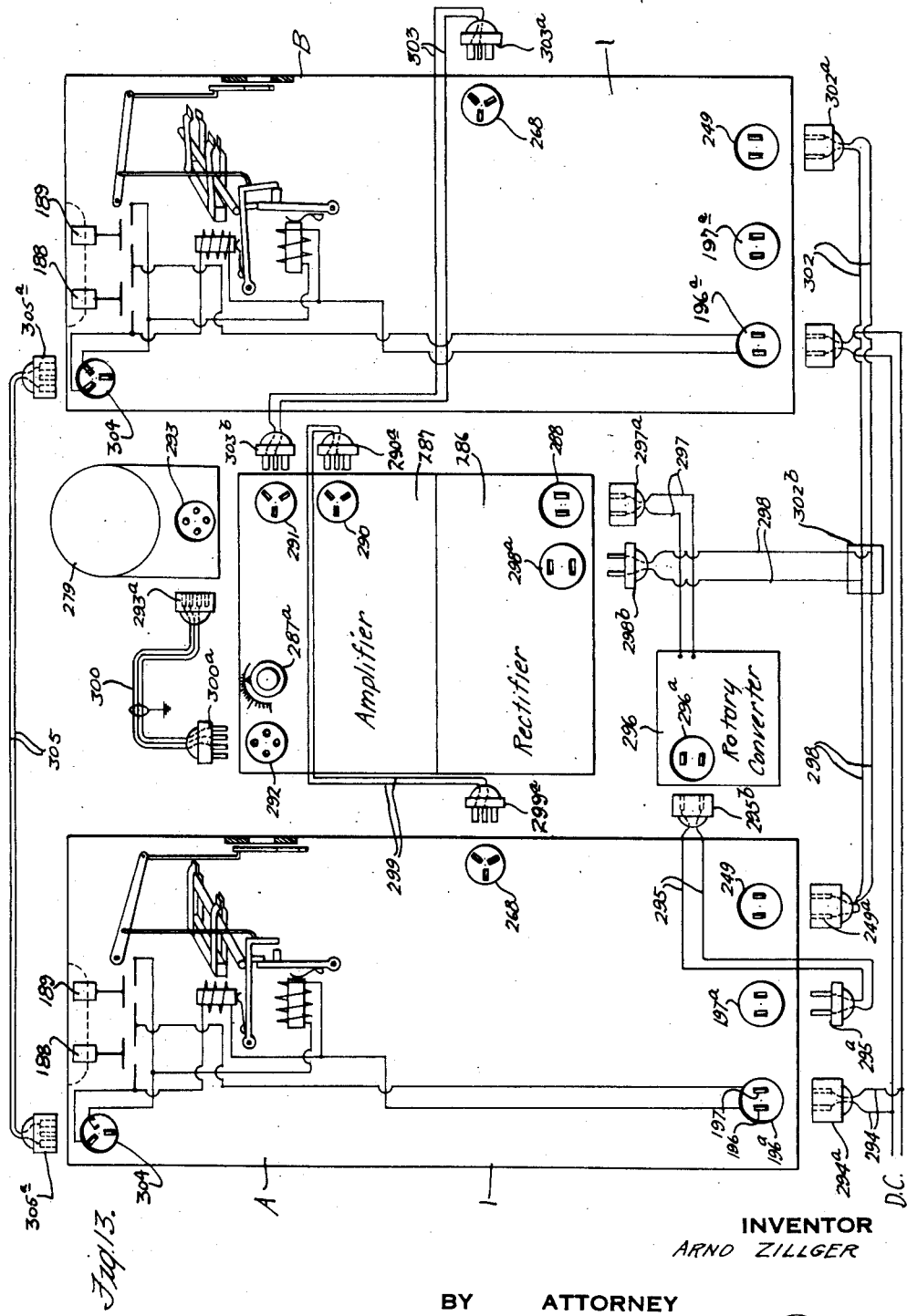

Patented Sept. 21, 1937

2,093,769

UNITED STATES PATENT OFFICE 2,093,769

PORTABLE SOUND-ON-FILM MOTION PICTURE PROJECTING APPARATUS

Arno Zillger, Narberth, Pa., assignor, by mesne assignments, to National Television Corporation, a corporation of Delaware Application October 29, 1931, Serial No. 571,744

12 Claims. (Cl. 179—100.3)

This invention relates to apparatus for producing sound from a sound track on a motion picture film and is especially directed to a portable apparatus which includes a motion picture projector as well as the sound equipment.

One of the objects of the invention is to provide such a portable apparatus which is compact, light in weight, easy to handle, and simple to set up and operate, so that it may be used by anyone and does not require a skilled operator.

Another object of the invention is to provide a sound-on-film reproducing device in which the film is carried at a very constant speed through the light beam directed upon the light sensitive cell so as to eliminate any vibrations which might affect the cell to produce an undesirable noise.

Still another object of the invention is to provide a sound-on-film reproducing device which may be positioned between the lower intermittent loop of the motion picture projector and the constant driving sprocket, thereby eliminating a large number of sprockets, rollers and other moving parts found heretofore in devices of this general class.

A more specific object of the invention is to provide a drum for carrying a film across a light beam for modulating it to produce the sound which will keep the film in proper alignment across the light beam without possibility of sidewise motion.

A still further object of the invention is the provision of an automatic switch for closing the picture gate of the motion picture projector and simultaneously disconnecting the circuits for the sound reproduction, and a simple means whereby this same switch may be connected with a second projector, where two projection machines are used, so that one machine may be stopped and the other started by the touch of a single button.

Another object of the invention is to provide a speed control for a motor adapted to operate on either alternating or direct current.

Still another object of the invention is to provide means whereby the amplifier and loud speaker may be mounted as one unit at a point remote from the projection machine.

Many other objects of the invention relating to the various desirable features, such as the mounting of the speaker in the case which acts as a baffle board, the arrangement of connection leads to connect the various separated elements in such a way that it is impossible to make a wrong connection, the provision of a control panel in the main projection case to facilitate operating the apparatus, the provision of various means to quiet the noise of the moving mechanical parts, and the provision of various other conveniences which enter into the design and construction of the apparatus and which increase its usefulness, will be apparent as the description of the invention proceeds.

The invention has been illustrated in the accompanying drawings in which:

Fig. 3 is a sectional front view of the drum for leading the film past the light beam;

Fig. 4 is a side elevational view of the drum shown in Figs. 1 and 3 with its cooperating rollers;

Fig. 5 is an elevational view taken from the opposite side of the supporting frame for the drum and showing the means for locking the drum bearing in position;

Fig. 6 is a sectional axial view of one of the rollers or idlers for guiding the film;

Fig. 7 is a sectional front view of the entire machine;

Fig. 8 is a rear view of the machine partly in section and showing principally the control panel;

Fig. 9 is a rear view of the speaker casing with the cover removed;

Fig. 10 is a sectional side elevational view of the speaker casing taken on the line 10—10 of Fig. 9;

Fig. 11 is a sectional plan view of the speaker casing containing the amplifier unit;

Fig. 12 is a schematic wiring diagram of the projection unit;

Fig. 13 is a schematic wiring diagram showing means of connecting the various elements, especially where two projection machines are used;

Fig. 14 is a schematic perspective view of a modified system of controlling the volume of the sound apparatus; and Fig. 15 is a schematic perspective view of another form of volume control.

Figure 1:
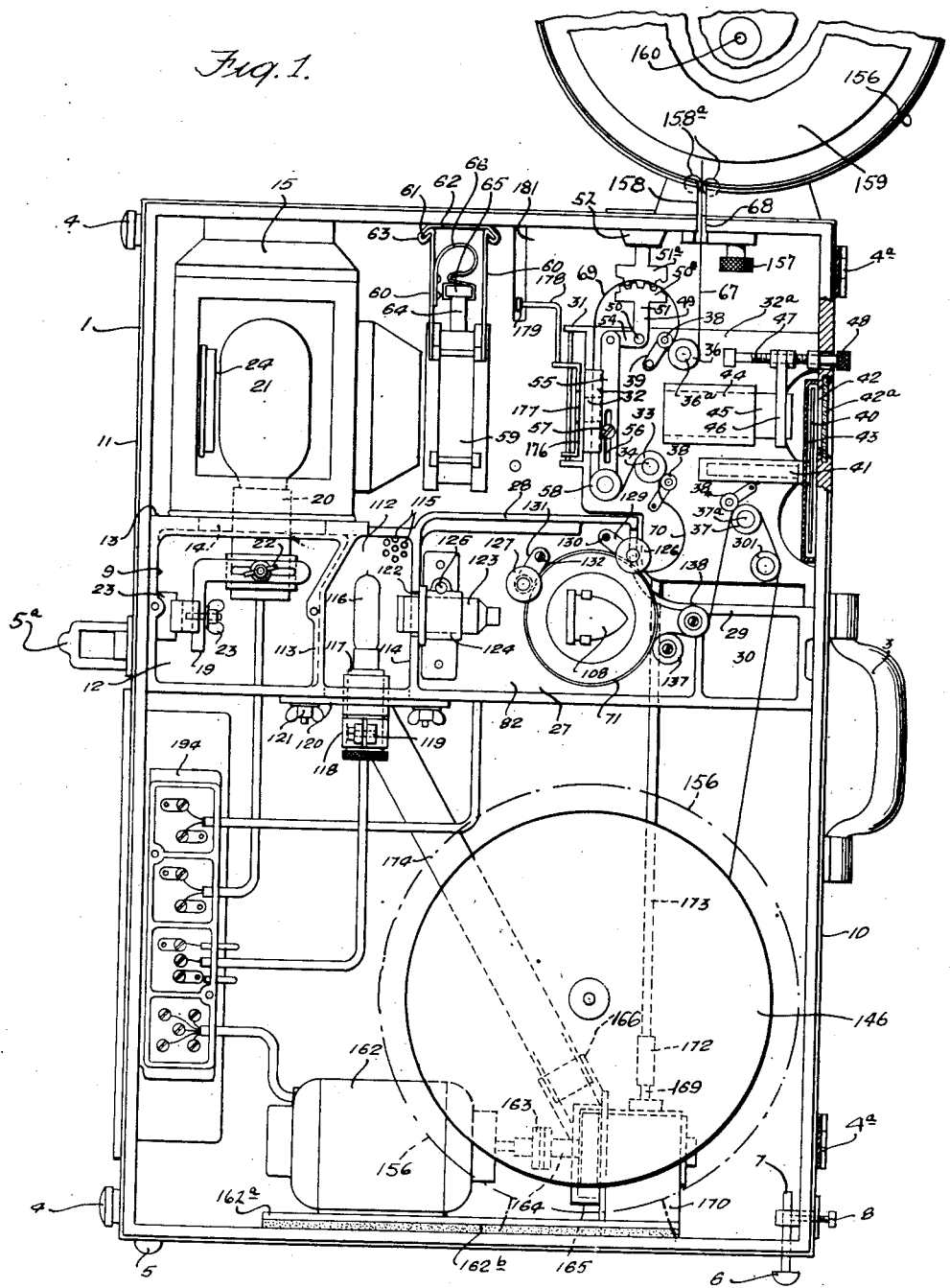
Fig. 1 is a side elevational view of the main case containing the projection apparatus and the sound reproducing apparatus, the cover of the case having been removed.

The entire equipment includes a case 1 in which the projection apparatus and the sound reproducing apparatus are enclosed and a second casing 2 which carries the loud speaker and in which the amplifying unit is adapted to be removably positioned for carrying purposes. Various connection cords and cables are carried in the case 2 there being sufficient room in this case for this purpose.

The casing 1 may preferably be formed of light wood or metal covered with a suitable finish such as leather and preferably lined with asbestos. The case may be rectangular in shape about the size of a large suitcase and may be provided with a handle 3 for carrying and suitable feet 4 for supporting the case during transportation. As the machine is adapted to be positioned on its end when in use it will be described in this position, that part of the casing having the handle being considered as the front as the picture is projected through this portion and that part of the casing having the feet 4 being considered as the rear thereof. A suitable door 1a may be attached to the casing by hinges 4a and a clasp 5a may be provided to secure the door in place. A window 6a of red glass is convenient for viewing the mechanism when in operation. A pair of feet 5 which may be of rubber or felt are provided toward the rear of the bottom and a second pair of similar feet 6 are provided at the front, these second feet 6 being mounted upon rods 7 which are adjustable so that the elevation of the front of the case may be adjusted. The rods 7 may be held by locking screws 8.

A frame 9 is supported from front to back of the casing at a position a little more than midway up from the bottom thereof. This frame may preferably be a casting and may be securely fastened to the front and rear walls 10 and 11 of the case by screws, bolts, or any other desired means. The frame is divided into a plurality of sections or compartments, the first 12, adjacent the rear wall 11, having a flat top 13 which is provided with a large opening 14. The projection lamp housing 15 rests upon the flattened top 13 of the frame and is secured thereto by any desired means. The projection lamp housing has an opening in its bottom corresponding to the opening 14 in the frame and the upper end thereof is aligned with an opening 16 (see Fig. 2) in the top of the case 1 which, if desired, may be provided with a suitable grating 17 out of which heated air from the projection lamp may pass. A suitable metallic baffle 18 may be provided in the opening 16 to prevent light from passing out of the top of the case but still giving free passage to the heated air.

An adjustable bracket 19 may be provided in the compartment 12 for supporting the socket 20 for the projection lamp 21, the socket 20 extending up through the opening 14 and positioning the lamp 21 in the housing 15. An adjusting nut 22 may be provided for loosening the socket 20 so as to rotate or raise and lower it or move it backwards or forwards while another adjusting screw 23 may be provided to move the bracket 19 from side to side so as to properly position the lamp. The lamp housing 15 may be provided with a suitable reflector 24 for directing the rays of light through a condensing lens 25 positioned in an aperture 26 in the front of the housing.

The forward compartment 27 of the frame 9 is provided with a top 28 slightly higher than the top 13 of the front compartment 12, and at a point about one-fourth the distance from the front of the machine this top is cut away to provide an opening 29 to permit the film to pass back and forth therethrough. The far side 30 of the frame at this point adjacent the top is cut down in height to make room for the film guiding mechanism above them.

At about one-third the distance from the front of the case and above the frame 9 I mount the picture gate 31 which may be of any suitable type provided with a pair of plates 32 between which the film is adapted to be drawn. The picture gate and associated sprockets and moving parts may be mounted upon a frame 32a which is supported upon the frame 9 and also may be attached to the front wall 10 of the case 1. An intermittent sprocket 33 may be mounted just in front of the picture gate and slightly below the aperture thereof upon a shaft 34 which passes through the frame 32a into the box 35, (see Fig. 7), which contains the mechanism for causing the sprocket to rotate intermittently. Any well known type of such mechanism may be used and it is deemed unnecessary to illustrate it here. A constantly driven sprocket 36 is mounted on the shaft 36a at a point forward and slightly above the aperture gate and is driven by the mechanism in the box 35. Also a second constant speed sprocket 37 may be mounted on a shaft 37a at a point forward of the picture gate and forward and below the intermittent sprocket 33, and this sprocket may also be driven from the mechanism in the box 35 in accordance with well known and standard projection machine designs. Idler rollers 38 mounted upon arms 39 may be provided where needed, as against the intermittent sprocket 33 and the constant speed sprockets 36 and 37 to hold the film against the sprockets and prevent slipping thereover.

A suitable shutter 40 may be mounted on a shaft 41 in the frame 32a and may be driven by the mechanism in the box 35. This shutter is adapted to rotate in front of the picture gate in a well known manner so as to intermittently cut off the light passing therethrough to give the film the necessary time to be moved past the picture gate and the next succeeding picture positioned for projection on the screen. A suitable opening 42 may be provided in the front of the casing 1 to permit the beam to be projected therefrom, and a plate glass window 42a may be inserted in this opening to diminish the noise of the machine which would otherwise pass through. Also a guard or cover 43 may be provided for the shutter to prevent anything coming in contact therewith when the machine is in operation. The guard or shield 43 is, of course, provided with an opening to align with the opening 42 so as to permit the projected picture to pass therethrough.

Between the shutter 40 and the picture gate 31 I provide an optical system comprising a sleeve 44 which is supported upon the frame 32a rigidly and a second cooperating sleeve 45 secured to an arm 46 mounted on a threaded rod 47 which is in turn rotatably mounted on the frame 32a. This rod extends through the front of the case and is provided with a knurled knob 48 which may be rotated by the operator who moves the sleeve 45 back and forth with respect to the sleeve 44 thereby adjusting the optical system so as to focus the picture upon a distant screen.

In order to properly frame the picture I provide a bell crank 49 pivoted on a pin 50 which is attached to the frame 32a of the projection device. The bell crank 49 has a long arm 51 upon which is mounted a gear sector 50a which meshes with another gear sector 51a pivoted in an escutcheon plate 52 set in the top of the casing and having a handle 53 (see Fig. 2) which protrudes slightly above the top of the plate. The escutcheon plate may be dished as shown so that the handle 53 does not come above the top plane of the casing. A second arm 54 of the bell crank extends rearwardly of the case 1 and is pivoted to a bar 55 which is positioned at one side of the picture gate and which is provided with a slot 56 through which passes a pin 57 which is fixed to the frame 32a and which permits the bar 55 to move vertically through a limited distance. At the bottom of the bar 55 is positioned an idler roller 58 under which the film passes before going over the intermittent sprocket 33. By moving the handle 53 backward and forward the bell crank 49 may be caused to rotate clockwise or counter-clockwise about the pivot 50 and the bar 55 is then caused to be raised or lowered which raises or lowers the roller 58. Raising or lowering the roller 58 raises or lowers the position of each individual picture in the picture gate, the additional film necessary being provided from the loop at the top of the picture gate, and by using this mechanism the picture may be properly adjusted in the aperture.

In order to prevent the film from overheating due to the intensity of the light beam I preferably provide a water cell 59 which is mounted on two plates 60 each having a flange 61 at the upper edge thereof turned outwardly and slightly downwardly. A plate 62 is positioned on the underside of the top of the case 1 and is also provided with side flanges 63 which are bent downwardly at the same angle as flanges 61 and upwardly again forming hooks over which the flanges 61 may be slipped and the water cell slid into and out of position in the path of the projection light. Inasmuch as the outfit is a portable one and may receive considerable shaking up in transit I provide a novel closure for the water cell which will permit the expansion caused by the heat but prevent any water from leaking out. To this end I provide a neck 64 at the top of the cell and a cork or leather stopper 65 rests on the top of the neck and is maintained in that position by a spring 66 which may be pivoted, if desired, to one of the plates 60 and which always exerts a pressure upon the stopper 65 thereby holding it over the opening in the top of the neck. Any tendency for the water to generate steam and expand will force the cork up and permit the gas to escape but in transit the cork is always held tightly in place by the spring and prevents the water escaping.

A protecting shutter 59a may be pivotally mounted on a bracket 60a to cut off the light beam when the water cell 59 is removed. A lug 61a on the shutter is engaged by the cell to swing the shutter out of the way, either against the tension of a spring or against gravity when the cell is inserted.

With the projection apparatus set up as indicated the film 67 comes down through a slot 68 in the top of the case 1 from a magazine to be hereinafter described and passes under the constantly driven sprocket 36 which thereby feeds the film at a constant speed into the apparatus. The film then forms an upper loop 69 and passes down between the apertured plates 32 and under the roller 58, which is attached to the framing bar 55, and upwardly again over the intermittent sprocket 33 and into the lower loop 70. In a standard projection machine from the loop 70 the film would pass over the constantly driven sprocket 37 and down to a winding wheel. The present invention, however, involves the positioning of the sound reproducing apparatus between the intermittent sprocket 33 and the constantly driven sprocket 37, or in other words it positions the sound reproduction apparatus so that the loop 70 is merely extended, permitting the film to pass across a light beam before it reaches the constantly driven sprocket 37.

In order to reproduce the sound from the sound track on the film I provide a drum 71 which is freely rotatable and over which the film is adapted to pass. This drum is especially constructed to carry the film at an extremely steady pace past the light beam and should be very carefully constructed and accurately positioned. It comprises a cylindrical sleeve 72 (see Fig. 3) whose front end is tapered on the inside down to a sharp edge as at 73 over which the sound track on the film is adapted to extend. The outer surface 74 of the outer end of the drum is also tapered from the sharp edge 73 with an increasing diameter to a shoulder 75 which separates it from an increased diameter portion 76 adjacent the base of the drum. The taper on this portion may be such that there is about one five thousandths (1/5000) of an inch difference between the diameter of the edge 73 and the base of the shoulder 75. The base end of the drum is provided with a plate 77 which may be formed integral therewith and which has a hub 78 attached to it extending a short distance beyond the plate 77 and bored very accurately to form an internal bearing surface for the drum. The sleeve 72 is made relatively thick so as to give the drum a large amount of inertia.

The drum 71 is mounted for rotation upon a bearing 79 which is slightly shorter than the inner face of the hub 78 on the drum and forms the outer end of a cylindrical member 80 which is adapted to have a sliding fit in a socket member 81 provided on the side wall 82 of the frame 9. The member 80 is larger in diameter than the bearing portion 79 and forms a shoulder 80a against which the inner end of the drum hub 78 is adapted to bear. The member 80 is also provided with a threaded section 83 of slightly larger diameter which is adapted to engage threads 84 in the socket 81 at the outer end thereof so that by rotating the member 80 it will move into and out of the socket. Beyond the threaded portion 83 of the member 80 is provided a circular rim or flange 85 having a series of notches 86 as clearly shown in Fig. 5. These notches are the same size and shape and are preferably spaced equidistant around the rim 85, and a locking plate 87 is provided secured to an enlargement 88 of the socket 81 by means of a screw 89. The locking plate 87 has a lug 90 which is adapted to fit into one of the notches 86 to hold the tubular member 80 against rotation and thereby also prevent movement axially thereof.

In order to hold the drum 71 upon the bearing member 79 I provide a sleeve 91 which extends through the bearing member 79 and the tubular member 80, a hole 92 being provided through the bearing member and the tubular member for that purpose. The inner end of the sleeve 91 is provided with a plate 93 which is formed integral therewith and which has a bearing surface 94 adapted to bear against the inner surface of the plate 77 of the drum and the outer edge of the plate 93 is slightly thinned so as to be out of contact with the plate 77. A set screw 95 is provided in the outer hub 96 of the tubular member 80 and a groove 97 is provided around the end of the sleeve 91 spaced slightly from the extreme end to receive the end of the set screw 95 so that the sleeve 91 may be adjusted axially and also rotatably.

An oil groove 98 is provided around the outer surface of the tubular member 80 at a point which comes within the socket member 81, and a conduit 99 is provided in the upper side of the socket 81 leading down to the socket and opening into the groove 98 in the tubular member. A hole 100 is provided in the end of the tubular member 80 extending inwardly from the bearing surface 80a on the hub of the drum and this hole communicates with a hole 101 which is drilled radially through the groove 98 in the tubular member 80. With this construction oil introduced into the conduit 99 flows around the groove 98 and in through the holes 101 and 100 to the bearing surface 80a at the end of the drum bearing and between the bearing 79 and the inner core of the drum hub. In this manner the drum is maintained with proper lubrication and can be rotated with a minimum of friction.

It will be noted that the inner surface of the sleeve 72 is also slightly tapered having the largest diameter at the inner face of the plate 77 and decreasing in diameter toward the tapered surface which comes from the edge 73. Any oil which flows from the bearing surface of the drum outwardly past the surface 94 of the plate 93 and over the edge of this plate will find itself inside of the drum and due to the tapered inner surface of the sleeve 72 will run toward the largest diameter due to centrifugal force. A hole 77a may be provided through the plate 77 at the corner where it intersects with the sleeve 72 which will permit any oil accumulating at this point to be discharged outside of the cylinder and away from the film so that there will be no possibility of oil getting on to the film. It will also be noted that when the drum is at rest the corner between the inner face of the plate 77 and the tapered inner surface of the sleeve 72 will be lower than other portions of that sleeve and any oil tending to drip in there will run to this point and will be discharged when the drum starts to rotate.

With the construction described above the drum may be adjusted axially until it is in a position where the edge 73 is aligned with the inner side of the light beam which is directed through the film and the drum bearing may then be locked in that position so that no further adjustment need be made.

A socket 102 adapted to receive the prongs of a light sensitive cell is attached by any desired means, as the screws 103, to the face of the plate 93. Any desirable type of socket may be used but I prefer one provided with two holes, a small one 104 and a larger one 105, (Fig. 4), spaced apart to receive the large and small pins 106 and 107 (Fig. 3 and 12), of the light sensitive cell 108 which may be of any suitable type. Wires 109 and 110 are connected to the socket so as to connect with the terminals 106 and 107 respectively and are brought out through the sleeve 91 for connection in a manner to be hereinafter described to the rest of the apparatus. Spring clips 111 may also be provided if desired to aid in supporting the light sensitive cell, these clips being secured by the screws 103 and extending outwardly partly around the tubular body of the cell. These spring clips 111 are usually not necessary as the contact springs in a standard socket are sufficient to hold the cell in position by its pins 106 and 107.

The sleeve 91 is adjusted so that the light sensitive surface of the cell 108 is directed toward the rear of the machine and the center of the surface should be a little beyond a plane through the edge 73 of the drum. As the drum adjustments are inside the casing it is desirable to have a hole 110a in the casing through which these adjustments may be reached. The hole may be covered with a plate 111a held in place by any desired means.

Another compartment 112 (see Fig. 1) is provided in the frame 9 between the compartment 21 and the compartment 12 and is defined by the front wall 113 of the compartment 12 and the rear wall 114 of the compartment 27. The upper surface 13 of the frame 9 is extended to form a cover for the compartment 112 and this cover or the side wall at the top may be provided with a plurality of holes 115 to permit air to circulate out of the top of the compartment. An exciter lamp 116 adapted to be energized by direct current in order to produce a steady light for the light sensitive cell is mounted in the compartment 112 upon a socket 117 which is held in an adjustable bracket 118. By loosening the screw 119 the socket may be rotated or moved vertically so as to line up the exciter lamp with its filament horizontal while the plate 120 upon which the bracket 118 is mounted may be moved bodily by loosening the thumb screws 121 with which it is fastened thus making it possible to adjust the exciter lamp horizontally. The partition 114 is provided with an opening 122 and in this opening is positioned an optical system 123 adjustably held by the bracket 124. A screw 125 holds the optical system rigid in the bracket and may be released to permit adjustment of the system. The optical system 123 may be similar to systems now in use for sound-on-film reproduction and may comprise a fine mechanical slot with means to project an image of the slot upon the film as it passes over the drum.

In order to make the film adhere to the drum as it passes over it from the loop 70 I provide a pair of rollers 126 and 127. The roller 126 (see Fig. 4) is rotatably mounted upon a pin 128 which is fixed in the end of an arm 129. The arm 129 is pivoted by the pin 130 to the rear wall 82 of the frame 9. A spring 130a is provided around the pivot point to urge the arm in a clockwise direction to bring the roller firmly in contact with the drum. The roller 127 is similarly mounted upon an arm 131 which is pivoted at 132 to the wall of the frame and is also provided with a spring 132a to urge the roller against the surface of the drum.

Both of these rollers are exactly alike and hence the description of the roller 126 will apply equally well to the roller 127. The roller 126 is provided at its outer end with a relatively large flange 133, (Fig. 3), which has a beveled edge 134 which is beveled away from the roller. The object of this flange beveled on its outer edge is to guide the film into position on the drum even though the edge of the film where the holes are positioned has been torn or cut out. Where some of the holes at the side of the film become worn or torn it has been the practice to cut out the torn portion of the film leaving a diagonal cut at each end of the worn place. It is desirable, therefore, to have the flange relatively large at the end of the roller so that it will be impossible for any such portion of the film to catch on the edge of the flange and damage the film any more than it has been damaged. The wide flange guides such a film in position without any danger of catching. The inner end of the roller 126 is provided with a portion 135 of larger diameter than the body of the roller and this portion is provided with a groove 136 a little wider than the width of the holes in the side of the film. The enlargement 135 is so arranged that it will contact with that portion of the film where the holes are between the picture and the edge of the film and the groove 136 is so positioned and is of such a width that the enlargement 135 straddles the holes in the film and rides against the film on either side thereof. This is an important feature of the invention because if the groove 136 were omitted the enlargement 135 would ride against the holes and would cause a bump as the roller went down into the depression caused by each hole in the film. This might cause a jerky movement of the film over the drum with a resultant choppy sound reproduction. It will be noted that the enlargement 135 of the roller presses against the film and holds it securely between and against the inner end of the drum adjacent the shoulder 75. Inasmuch as the remainder of the roller 126 is smaller in diameter than the enlargement 135 there is no contact between this part of the roller and the film or the drum, the film being held solely at its inner edge adjacent the shoulder 75. This prevents any wear on the surface of the film which might cause damage to the picture. It will also be noted that the arm 129 which supports the roller 126 is mounted so that any tendency to pull the film over the drum at an increase in speed will cause the roller 126 to be drawn towards the drum. This prevents the film from slipping over the drum and causes it to be held to the speed of the drum as it passes therearound.

As the film leaves the drum to pass up to the constantly driven sprocket 37 it is desirable to have a slight resiliency in the film in order to prevent vibration from the constantly driven sprocket being carried to the drum. I have found that this resiliency in the film may be provided by means of a pair of rollers 137 and 138 positioned in such a way that the film must, in going over the first and under the second, take the form of an S as shown in Figs. 1 and 4. The rollers are spaced close enough together and the rollers are small enough in diameter so that the film must make bends of relatively short radius against its natural tendency to straighten out. This causes it to curve out around the rollers on a radius greater than the radius of the rollers, as shown in Fig. 4, so that an extra pull on the constant sprocket which is drawing the film through the device may merely take up on the film by decreasing the radius of the curvature on these rollers and not increase the speed of the film as it passes over the drum, thus maintaining the drum at a constant speed and preventing vibration from affecting it. A section of the rollers 137 and 138 is shown in Fig. 6 in which each roller is shown to have a suitable groove 139 over which the picture section of the film rides without touching and enlargements 139a at each end upon which the edges of the film rest. A circular recess 140 is formed in the outer end and a spring washer 141 is adapted to be inserted in the recess 140, the roller being mounted upon a spindle 142 provided with a slotted head 143 and a threaded opposite end 144 of slightly reduced diameter which is threaded into a lug 145 provided in the frame member 9. The effect of the spring washer 141 is to cause a slight friction against rotation of the roller and this friction may be adjusted by screwing the spindle 142 into and out of the lug 145. A slight friction on these rollers is preferable to prevent the film from running too easily on the roller and to therefore maintain it under tension.

The film is adapted to be wound upon a reel 146 removably mounted upon a shaft 147 supported for rotation upon a bracket 148, (Figs. 2 and 7), mounted on the side wall of the case 1 by means of the screws 149. A pulley 150 is rotatably mounted on the shaft 147 and is adapted to be rotated by means of a belt 151 which passes around it and another pulley 152 which is mounted on a shaft 153 rotated by the mechanism in the box 35. A disc 154 is free to slide on but must turn with the shaft 147 while a collar 154a, spaced from the disc, is rigidly connected to the shaft and a coil spring 155 is mounted on the shaft 147 and bears against the collar 154a and the disc 154 so that it acts as a friction clutch causing the pulley to rotate the shaft 147 but permitting slipping of the shaft with respect to the pulley. This friction clutch is necessary because the speed of the winding film is different when the reel is almost empty than when it is filled and hence the speed of the pulley 150 is arranged, by the relative sizes of the pulleys 150 and 152 and the speed of the shaft 153, so that it will tend to turn the reel 146 at all times faster than the film is being fed to it. Thus the shaft 147 will slip slightly with respect to the pulley 150, the slip being greater when the reel is filled with film than when it is empty.

The reel for holding the film which is to be set into the machine may be supported in a casing or magazine 156 which is removably positioned at the top of the case 1 by means of a bolt 157 and has a slot 158 in the bottom thereof to align with the slot 68 in the top of the case 1. Rollers 158a are preferably provided at the sides of the slot 158 to prevent the spread of fire up into the magazine should the film burn in the machine and to prevent wear on the film at this point. The unwinding reel 159 is mounted on an axle 160 which is fixed to the rear wall of the casing 156 and is held in place by the cover 156a which is hinged to the casing 156 and may have a snap fastener. A depression 161 is provided in the center of the cover 156a and when the machine is not in use or after the film has been projected the casing 156 may be removed from the top of the apparatus by loosening the bolt 157 whereupon it may be placed in reversed position with the end of the shaft 147 engaging the depression 161 in the cover 156a. In this position, shown in dot and dash lines in Fig. 7, it fits easily within the casing 1.

Figure 2:
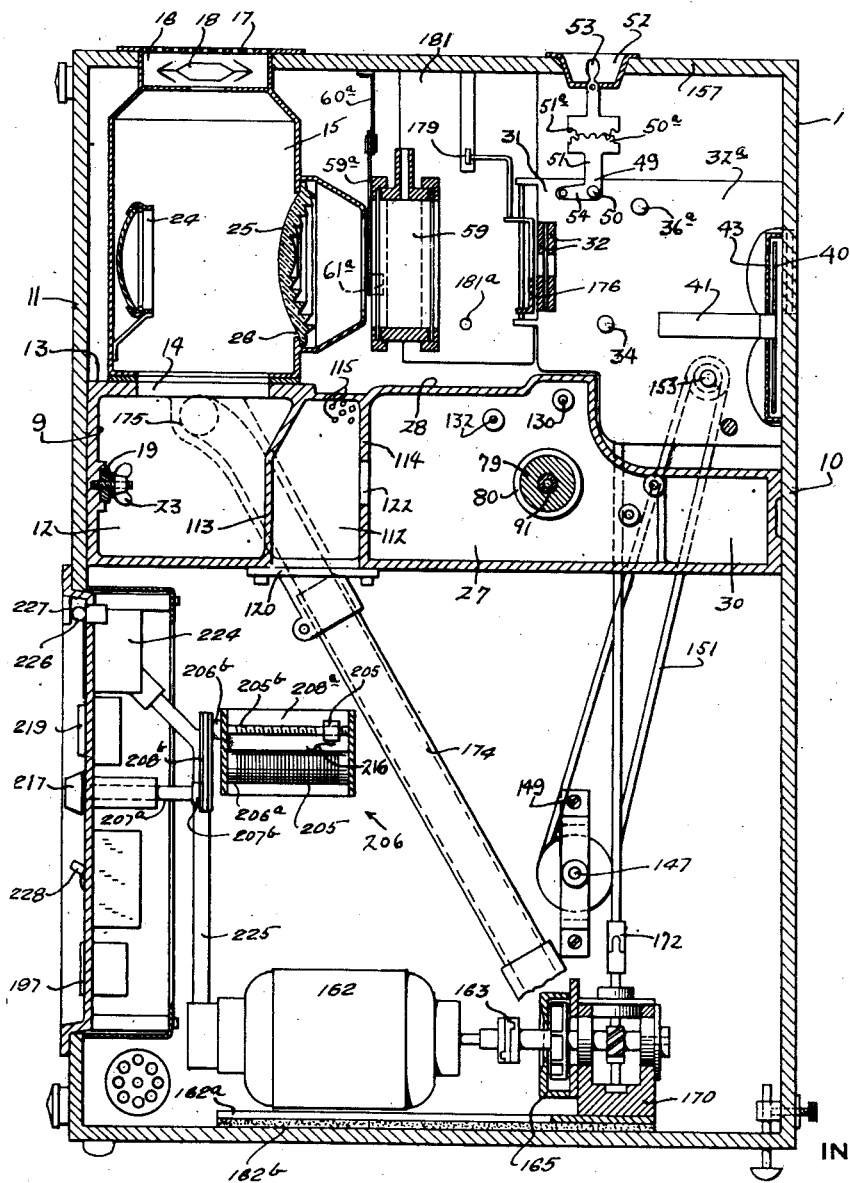
Fig. 2 is a sectional side elevational view of the same case on a plane about midway through the projection apparatus.

In order to drive the projection apparatus I provide a motor 162 which may preferably be one wound for alternating or direct current, and I preferably support this motor at the bottom of the case 1, as shown in Figs. 1, 2, and 7, on a base 162a resting upon a sponge rubber sheet 162b. The motor shaft is directly connected through a flexible coupling 163 to the shaft 164 of an air pump 165 which may be of the centrifugal type and which may have an outlet 166, the purpose of which will be described later. The other end of the pump shaft 164 may be connected to or may be provided with a spiral gear 167 and a second spiral gear 168 may be provided to mesh therewith and may be mounted upon a vertical shaft 169. The gears 167 and 168 for convenience may be mounted in a suitable enclosed casting 170 which is attached to the motor supporting plate 162a at the bottom of the apparatus. The vertical shaft 169 may be provided with a flexible coupling 172 which is in turn attached to a second vertical shaft 173 which extends upwardly into the mechanism box 35 where it is attached to suitable gears for providing the rotation of the mechanism in the box.

From the air pump outlet 166 I provide a pipe 174 which extends upwardly on the far side of the case 1 and connects with an opening 175 in the further side of the compartment 12 so that when the motor is running air is forced through the pipe 174 by the pump 165, up into the compartment 12, through the opening 14 around the socket of the projection lamp 21, through the lamp housing 15, and out through the opening 16 in the top of the case thereby maintaining the lamp cool and preventing overheating thereof. The exciter lamp may also be cooled by admitting some of the air from the pipe 174 into the compartment 112 but I have found this to be unnecessary.

Between the aperture plate 32 and the water cell 59 I provide a picture gate 176 which consists of a plate having a portion 177 adapted to close the opening through the plates 32 when the gate 176 is in its upppermost position and to permit light to pass through the plates 32 when it is in its lowermost position. The plate may be guided in its movement by suitable guides attached to the aperture plates 32. The movement of the picture gate is controlled by an arm 178 which is loosely attached thereto (see Figs. 2 and 12), and is bent over at right angles so that its end passes through a hole in the outer end of a lever 179 which is pivoted by the pivot 180 to the wall of a small casing 181 secured to the top of the case 1. A bar 182 is pivoted on the lever 179 and is connected to one end of an armature 183 which is pivoted at 183a on the switch casing 181. An electro-magnet 184 is mounted adjacent the armature 183 and is adapted to rotate it in a counterclockwise direction about the pivot 183a when the magnet is energized, thus moving the bar 182 upwardly and pivoting the lever 179 to raise the picture gate 176. A spring 184a is attached to the armature 183 and bears against the magnet 184 so as to normally urge the armature away from the magnet thereby opening the picture gate 176. A second armature 185 is mounted beneath the armature 183 and at right angles to it and is pivoted at 185a. This armature is close enough to the armature 183 to just clear it when the armature 183 is in its lowermost and normal position and a magnet coil 186 is provided adjacent the armature 185 on the left hand side thereof, as shown in Fig. 12, and a spring 186a is provided attached to the armature 185 and bearing against the magnet to normally urge the armature in a clockwise direction away from the magnet. A lug 187 is attached to the armature 183 and extends downwardly beyond the upper end of the armature 185. This lug is so positioned and is of such a length that when the armature 185 is moved by the magnet 186 to its extreme counter-clockwise position the lug is bearing against the right hand side of the armature 185 so that it holds the armature 185 in this position and when the armature 183 is rotated counter-clockwise, as by the force of the magnet, the lug 187 is raised sufficient to clear the upper end of the armature 185 and permit it to retain its normal position whereupon the armature 183 is held in raised position by the lug 187 resting upon the top of the armature 185. The end of the armature 183 is turned downwardly forming an extension 187a, and a lug 185b extends from the right hand side of the armature 185 and is of such length that it strikes the extension 187a when the armature 183 is raised and the armature 185 moves to normal position, thereby preventing this armature from moving further.

Two push button switches 188 and 189 are provided, the first to energize the magnet 184 and the second to energize the magnet 186 in a manner to be hereinafter described. If the button 188 is pressed the magnet 184 pulls up the armature 183 and the armature 185 slips under the lug 187 to hold the armature 183 in raised position. Raising the armature 183 causes the picture gate to close thereby cutting off the projection of the picture and preventing any light from striking the film. Depressing the button 189 energizes the magnet 186 and draws the armature 185 away from its normal position and the lug 187 slips off the top of the armature 185 and the armature 183 falls to its normal position which causes the picture gate to open.

The buttons 188 and 189 may protrude through holes 188a and 189a in an escutcheon plate 188b which may be mounted in the top of the case 1 and may be dished so that the tops of the buttons come below the plane of the top of the case 1. Thus the picture gate may be controlled from the outside when the machine is in operation with the cover closed. However, it may be desirable to manipulate the picture gate when the operator is threading the film in the machine and if so, if the gate is in its lowermost position it may be raised manually as the armature 183 is free to be raised against the tension of the spring 184a. If the picture gate is closed, however, and it is desired to open it I provide a push rod 181a mounted in a hole 181b in the casing 181 in front of the armature 185. The push rod may be prevented from coming outwardly through the casing by a cotter pin 181c through the rod immediately inside of the casing and may be prevented from pushing into the casing beyond a predetermined limit by means of a spring 181d which may surround the rod between the cotter pin 181c and a bracket 181e which is secured to the casing 181. Pushing in the rod 181a against the tension of the spring 181d will cause it to strike the armature 185 and push it inwardly from under the lug 187, thus permitting the armature 183 to fall bringing down the picture gate 176 and opening the aperture.

Means is provided to disconnect the light sensitive cell and the exciting lamp whenever the picture gate 176 is closed so that when the picture is not being projected there will be no sound produced in the loud speaker due to movement of the operator in inserting a new film or making adjustments inside of the apparatus. This is accomplished by means of two switches comprising two pairs of spring arms 190 and 191 which are connected respectively to the light sensitive cell and to the exciter lamp in a manner to be hereinafter described. The arms 190 and 191 are attached to an insulating member 192, and an insulating rod 193 connected to the armature 183 is positioned between the springs of each pair so that when the armature is in its lowermost position the two arms of each pair are in contact and the switches 190 and 191 are thereby closed while if the armature 183 is drawn to its uppermost position the rod 193 lifts the upper arms of the switches 190 and 191 opening them and thus disconnecting the exciter lamp and light sensitive cell.

In Fig. 1 is shown a terminal box 194 to which all of the wires from the electrical equipment inside of the case 1 are brought and in Fig. 8 the control panel 195 which is mounted on the back of the case 1 is shown. This control panel is adjacent the terminal box 194 and the connections between the two and to the rest of the electrical equipment are illustrated diagrammatically in Fig. 12. A removable cover plate, (not shown) is preferably furnished for protecting the various controls on the panel. Input terminals 196 and 197 are provided on the control panel for making the input connection to the apparatus with means to be hereinafter described. The terminal 196 may be connected by means of the wire 198 to the motor starting switch 199, the other side of which is connected by means of the wire 200 to the terminal 201 in the terminal box 194 and from there is connected to one end of the field coil 202 of the driving motor 162. The other end of the field coil is connected to the terminal 203 in the terminal box and from there by means of a wire 204 to one side of the coil 205 of a potentiometer resistance 206. The other end of the coil 205 of the potentiometer is connected by means of the wire 207 to the terminal 208 in the terminal box and from there by the wire 209 to one brush 210 of the armature 211 of the motor.

The other brush 212 of the armature may be connected by means of a wire 213 to a terminal 214 in the terminal box and then by means of a wire 215 to a movable arm 216 which bears against the resistance coil 205 of the potentiometer 206. A knob 217 attached to the arm 216 may protrude through the control panel to regulate the potentiometer.

The other terminal 197 is connected by means of the wire 218 to a fuse 219 set in the control board where it can be reached by the operator and thence by means of a wire 220 to a terminal 221 in the terminal box and from there by means of a wire 222 to one end of a second field coil 223 of the motor, the other end of which is attached to the armature brush 210.

With this construction there is one circuit through the field coil 202, the right half of the resistance coil 205, the arm 216 of the potentiometer, the armature, and the field coil 223, all in series, while there is another circuit through the field coil 202, the total length of the resistance coil 205 and the field coil 223 in series.

With the arm 216 at the extreme right side of the coil 205 the motor acts as a straight series motor with the full value of available resistance shunted across the armature. This full resistance will permit the maximum available current to flow through the armature and produce the fastest speed. At the same time there is no resistance in series with the fields of the motor which is also a condition of maximum speed.

As the arm 216 is moved toward the left a resistance is introduced into the field circuit and gradually increased while at the same time the resistance shunted across the armature is decreased. Thus the overall potential drop across the motor is increased while the current flowing through the armature is lessened, both conditions tending to slow down the motor.

If the arm 216 were to be moved completely to the left of the coil the armature would be shorted and in most cases no speed could be expected. I prefer therefore to provide a stop 216a on the coil 205 near the left end to prevent the arm from moving completely to the left.

With the hook-up as described above regulation as to constant speed of the motor may be efficiently and effectively had with either alternating or direct current, with practically constant torque, and under variable load conditions. Therefore, the projection machine may be used on alternating or direct current lines of varying potential with excellent results.

In order to get sufficient resistance in the coil 205 I wind it upon a tube 206a of insulating material (see Fig. 2) and support it in a casing 208a, the casing being provided with openings so that the coil may be cooled by a circulation of air. The casing 208a may be mounted inside of the case 1 above the motor 162. The contact arm 216 may be any type of spring contact adapted to ride upon the turns of the coil 205 and may be supported on a metal block 205a which is insulatedly threaded upon a threaded rod 205b and is rotatably mounted in the casing 208a. The shaft 207a upon which the controlling knob 217 is mounted may extend into the case adjacent the casing 208a and may be operatively connected with the threaded shaft 205b as by sprockets 206b and 207b on the rods 205b and 207a respectively and a chain 208b passing around the two sprockets. The coil 205 must be wound in such a way that the proper resistances are obtained at each side of the contact point 216 in order to obtain the desired result, i. e. the speed control of the motor.

The speed of the motor and thereby the speed of the film, as the motor is directly connected to the film movement of the apparatus, may be read from a tachometer 224 which is mounted at the top of the control panel. This tachometer may be connected by means of a covered flexible cable 225 to the motor shaft, as indicated in Fig. 2, and may be arranged to read in feet per minute of the film so that the operator may know at a glance the speed of the film passing through the projection machine.

The projection lamp 21 is controlled by a switch 228 which may have one end connected by means of the wire 229 to the wire 220 which is connected to the power circuit through the fuse 219 and its other end connected by means of the wire 229a to the terminal 230 on the terminal block. From there a wire 231 may connect to the light bulb 21 and from the other side of the light bulb the wire 232 may be brought to the terminal 233 on the terminal block. From this terminal a wire 234 may connect with the wire 198 which is the main power wire. When the switch 228 is closed the projection lamp 21 will be energized entirely independent of any of the other parts.

The automatic switch for controlling the picture gate 176 is energized by means of a wire 235 which is connected to the main power wire 198 and is brought up to terminal 236 at the upper end of the terminal block and then by means of wire 237 to the bar 238 which is common to both switch buttons 188 and 189. The button 188 is mounted on a rod 238a which carries a contact bar 239 adapted when the button is pressed to connect the bar 238 with a contact blade 240 which is connected by means of a wire 241 to the upper end of the magnet coil 184, the other end of which may be connected by means of the wire 242 to the terminal 243 on the terminal block. This terminal is connected in turn by means of wire 244 to the wire 220 which is connected through the fuse 219 to the other power terminal 197. Thus by pressing the button 188 the magnet 184 is energized. The rod 238a may be normally held in its upper position by the spring 244a.

The button 189 is mounted on a rod 245 which carries a contact bar 245a adapted when the button is depressed to connect the common bar 238 with a blade 246. This blade is connected by means of a wire 247 to the magnet coil 186, the other end of which is connected by means of the wire 248 to the wire 242 which is connected to the terminal 243 and then to the power line through the fuse 219. The button 189 may be normally held in its upper position by a spring 248a. It is evident, therefore, that by pressing the button 189 the magnet 186 is energized.

The exciter lamp 116 is preferably energized by direct current in order to eliminate any possibility of a hum being produced in the loud speaker due to the fluctuation of alternating current and hence I provide an independent inlet connection 249 having two terminals 250 and 251. From the terminal 250 a wire 252 is connected to one side of a switch 253 which is mounted on the control panel and the other side of the switch may be connected by means of a wire 254 to one side of an ammeter 255 at the top of the control panel for registering the amount of current which the exciter lamp is using. The other side of the ammeter may be connected by means of a wire 256 to a variable resistance 257, the arm 258 of which may be controlled by a knob 258a and may be connected by means of a wire 259 to a terminal 260 in the terminal block. Wire 261 may connect the terminal 260 to the lamp 116 and a wire 262 may lead from the lamp to a terminal 263 in the terminal block. From this terminal a wire 264 is brought up to one spring arm of the switch 191 and the other arm of the switch is connected by means of a wire 265 to a terminal 266 in the terminal block from which the wire 267 leads to the other connection terminal 251. With this circuit an adjustment of the resistance 257 by means of the knob 258a will control the current flowing in the exciter lamp and the brightness thereof while the control switch 253 turns it on and off and the switch 191 also turns it off when the light gate is closed for cutting off the projection of the picture.

A pilot lamp 226 may be mounted at the top of the control panel under a suitable shield 227 for directing the light down upon the panel. This lamp is necessary only when the machine is operating with a sound film as it is then essential to keep the proper speed for the motor and the correct exciter lamp current. Hence I connect the lamp to the wires 254 and 267 by means of wires 226a and 227a respectively so that it will light when the exciter lamp is lighted.

Another terminal connection 268 having terminals 269 and 270 is provided in the case 1 at a point on the far side just above the position of the drum, (Figs. 3 and 12), and this is used for making the necessary connection from the light sensitive cell to the amplifier. One wire 271 is lead from the terminal 269 up to one bar of the switch 190 while a wire 110 (already described) connects the other spring bar of the switch to the plug 107 of the light sensitive cell. The other terminal 106 of the light sensitive cell is connected by means of the wire 109 to ground on the frame of the machine as indicated at 272 (Fig. 3). Another wire 273 is connected from the terminal 270 to ground on the machine as at the same point 272. Thus one side of the light sensitive cell is grounded. In making these connections to the light sensitive cell I have found it desirable to use a single wire with a metallic shield on the outside. The wire may then take the place of the wire 110 while the shield may be used for the wire 109. This provides a shield for the sensitive side of the light sensitive cell circuit and at the same time facilitates inserting the wire through the sleeve 91.

The loud speaker case 2 may be made preferably out of material which will act as a baffle board for the speaker and may be finished preferably in the same way as the main case 1. A handle 274 may be provided to carry the case by and suitable feet 275 may be provided to rest it on. The cover 276 may be hinged at 277 and provided with a suitable lock 278 to secure it in closed position. A loud speaker 279 of any desired construction such as a dynamic speaker is mounted in the case upon the rear wall 280 thereof and a suitable metal grating 281 may be provided in the wall of the casing to permit the sound to pass through to prevent the speaker being damaged by anything entering the opening during transportation. The case is adapted to be used with the cover in its open position as the case acts as a baffle board for the speaker. An amplifier, filter and rectifier unit 282 is mounted on a base 283 which is adapted to slide upon steel tracks 284 in the case 2 and is removable from the case, a handle 285 being provided for convenience of drawing it out. This unit comprises a rectifier 286 and an amplifier 287 neither of which will be described in detail as they may be any standard equipment used in connection with sound reproduction and do not form a part of this invention other than the novel method of mounting and assembling them. The amplifier may be provided with a volume control knob 287a for controlling the volume of the speaker.

In making the connections between the various units I make use of "caps" which may be connected to the ends of cables and have connecting prongs extending outwardly therefrom; "receptacles" which are adapted to be mounted in openings in the various casings and are provided with contact wells to receive the cap prongs; "plugs" which consist of insulating blocks adapted to be connected to cable ends and provided with contact wells similar to the receptacles; and "bodies" which are adapted to be mounted in openings in the casings similar to the receptacles but which have a plurality of upstanding connecting prongs set in a cavity to fit into the contact wells of the plugs.

The amplifier unit is provided with a power intake body 288 on the base 283 for both the rectifier and amplifier power supply and a receptacle 298a is also mounted on the base 283 for the outlet to the exciter lamp. An input receptacle 290 is provided for the input for the light sensitive cell and a second receptacle 291 may be directly connected to this for a purpose to be hereinafter described. An outlet receptacle 292 is provided having four terminal connections (depending on the type of speaker used) to connect with the loud speaker and a four terminal body 293 is provided in the loud speaker unit itself.

In Fig. 13 is shown diagrammatically the method of connecting the various units, the figure including a second projection machine, as it is often desirable to use two machines in giving a performance so that the film can be started in one as soon as the first reel is finished in the other machine, without delay in the performance. When alternating current is used certain parts of the equipment may be dispensed with and for convenience direct current has been indicated as the source of supply in the drawings.

An ordinary power supply cable 294 is connected to the direct current supply and is provided with a plug 294a to fit into the inlet body 196a in the case 1 which contains the terminals 196 and 197. A receptacle 197a is directly connected to the body 196a and a cable 295 is provided with a cap 295a for connecting to the body 197a. A plug 295b is provided on the end of the cable for connecting to a converter or motor generator set 296 which contains a body 296a for receiving the plug. A cable 297 delivers alternating current from the converter to the rectifier and amplifier by means of a plug 297a which fits into the body 288 thereby supplying the power for both the amplifier and rectifier. A portion of the rectified current is brought out by the cable 298 through the receptacle 298a and the cap 298b which is attached to the cable and fits therein. The other end of the cable 298 has a plug 249a which fits into the exciter lamp body 249 in the projector apparatus. This furnishes the exciter lamp with direct current. The light sensitive cell is connected to the amplifier by means of a cable 299 having a cap 299a which fits in the receptacle 268 in the side of the projection apparatus and a cap 290a at the other end to fit into the receptacle 290 which is the inlet of the amplifier. Also from the outlet receptacle 292 of the amplifier a four wire cable 300 provided with a cap 300a to fit into the receptacle, leads to the loud speaker 279. A plug 293a on the end of the cable fits into the body 293. The cable 300 is preferably shielded with a metal covering which may be grounded. When these connections have been made the single projection apparatus is ready to be operated.

The film magazine 156 having been properly positioned on top of the case 1 and a loaded reel 159 placed in position, the film is then threaded downwardly between the rollers 158a and through the slot 158 and the slot 68, down under the driving roller 36 and between it and one of the spring pressed rollers 38 into the upper loop 69. The film then passes down between the aperture plates 32 and underneath the adjusting roller 58 and up and over the intermittently operated sprocket 33 where it is held in place by another spring pressed roller 38. The film then passes into the lower loop 70 from which it goes directly around the drum 71 being held in position by the rollers 126 and 127, and from the drum it passes over the roller 137 and under the roller 138 giving it the necessary tension, both of these rollers being braked, and then up over the constantly driven sprocket 37 where it is held by another spring pressed roller 38. After passing over the sprocket 37 the film may pass over an idler pulley 301 whence it may be wound upon the winding reel 146.

When the film has been inserted in the machine the door 156a of the film magazine is closed and the door of the casing 1 is closed. With the picture gate closed, the projection lamp switch is closed to light the projection lamp and the exciter lamp switch 253 is closed. The sound equipment is not energized, however, as the switches 190 and 191 are open. The operator then closes the motor switch 199 which starts the film moving and then presses the button 189 at the top of the machine. This automatically opens the picture gate and turns on the exciter lamp and light sensitive cell so that the picture is seen and the sound heard simultaneously.

The film will be fed through the motion picture projector similarly to any standard projector, the intermittent sprocket 33 drawing the film intermittently down between the aperture plates 32 while the shutter 40 rotates to cut off the light during the time that the film is in motion. The constantly driven sprocket 37 pulls the film from the loop 70 after it leaves the intermittent mechanism and over the drum 71 thus rotating the drum and causing the film to pass the light beam which comes from the exciter lamp and is directed in a fine line at the edge of the film by the optical system 123. The light shining through the film falls upon the light sensitive cell 108 which modulates the input of the amplifier 287 and produces the sound effect in the loud speaker 279.

It should be particularly noted that the drum 71 is not driven in any manner except by the film and that it has considerable inertia so that it tends to steady the passage of the film around it. Another important fact is that the movement of the film from the loop 70 to the constantly driven sprocket 37 is caused entirely by that sprocket. Therefore, the film is under tension from the moment it strikes the drum 71, and is held thereagainst by the spring pressed roller 126, the moment it touches the constantly driven sprocket 37. The film is not pushed upon the drum 71 but is drawn at a steady rate over it. Between the drum and the constantly driven sprocket 37 is provided the braked rollers 137 and 138 which are so positioned that the film is caused to assume an S curve over them which causes the natural stiffness of the film to provide a slight resiliency in the pull of the film between the sprocket 37 and the drum, so that any irregularities in the steady rotary movement of the sprocket 37 will be absorbed by the film itself as it passes over the rollers 137 and 138. Thus there is no vibration on either side of the drum 71 which can affect its steady rotation. This is very important as it produces a quality of sound not found in apparatus heretofore used.

The speed of the motor and the rate of the film through the projector may be controlled by rotating the knob 217, the number of feet passing per minute being registered in the tachometer 224. Also the excitation of the lamp 116 may be controlled by the rheostat 257 by rotating the knob 258a, the current being indicated by the ammeter 255.

When the end of the film has been reached it is only necessary to press the button 188 on the top of the case 1 whereupon the picture gate 176 will immediately close and cut the picture off of the screen and the exciter lamp and light sensitive cell will be disconnected so that no more sound is heard. After that the motor can continue running until all of the film has been completely wound upon the reel 146 when it too may be shut off as well as the main projector light 21.

In Fig. 13 two projection machines A and B are shown, the connections for the machine A having been already described. In such a case it is necessary to provide an additional cable 302 connecting the exciter lamp input body 249 of the projection machine B with the cable 298 so that the exciter lamp for both machines will be provided with current from the rectifier output receptacle 298a. The cable 302 may have a plug 302a for engaging the body 249 of the second machine and a connecting box 302b at the other end of the cable may be spliced into the cable 298. There is also provided an additional cable 303 connecting the additional amplifier inlet receptacle 291 with the light sensitive cell output receptacle 268 of the projection machine B. This cable may have caps 303a and 303b for connecting to the receptacles 268 and 291 respectively. An additional body 304 is provided on each projection machine having two active terminals which are connected to the springs 240 and 246 of the switches controlled respectively by the buttons 188 and 189. A cable 305 is provided to connect these two sockets together and has a plug 305a at each end to fit into the bodies 304. This cable has its terminals reversed and the plugs are so arranged that they can be inserted in only one position so that when the cable is properly attached the switch arm 240 of machine A is connected to the switch arm 246 of machine B and the switch arm 240 of machine B is connected to the switch arm 246 of machine A. If the button 189 on machine A is depressed therefore it not only energizes the magnet coil 186 in that machine but also the magnet coil 184 in the other machine, thereby opening the picture gate in machine A and closing the picture gate in machine B. At the same time, as has already been described, this turns on the exciter lamp and light sensitive cell in machine A, but it also turns off the exciter lamp and the light sensitive cell in machine B. Depressing the other button 188 causes the opposite to take place. It is, therefore, possible with this novel combination to have one machine A operating and producing a picture on the screen and a sound in the loud speaker and, while this machine is in operation, to fill machine B with a new film. Then when the film is about completed in the machine A the operator stands ready at the machine B with his finger on the button 189 and when the film in machine A has reached its end he presses that button which automatically opens the picture gate in the machine B and closes the picture gate in machine A at the same time transferring the amplifier connections from the light sensitive cell and exciter lamp in machine A to those in machine B. The motor and projection lamp in machine B have, of course, been started before the button is depressed. The operator can then change the film in machine A and be ready to reverse this operation when the film in machine B has reached the end thereof. The result of this feature is that a moving picture program consisting of several reels may be put on without any pause whatsoever between the reels, and the change is so instantaneous, due to the electrical switches, that the audience is not conscious that one machine has been turned off and another turned on but sees and hears the picture and sound as one continuous performance.

In order to bring out the important features of the invention I desire to again emphasize some of them as they all combine to produce a portable motion picture outfit which is simple, compact, and has a high standard of efficiency and is easy to transport, set up, and operate. Among these important features is the fact that the film is pulled by a constantly driven sprocket from one side of the drum only, there being a free loop at the other side of the drum. This places the film under tension throughout its movement around the drum and insures its lying close against the drum so that it always comes at the focal plane of the concentrated rays from the optical system and exciter lamp. This construction also permits the constant steady movement of the film without interference of other moving parts of the apparatus which might tend to cause a variation of the steady movement of the film past the light beam.

The positioning of the sound reproducing means between the intermittent sprocket and the constantly driven sprocket is important in that it merely makes use of an extended lower loop and eliminates the necessity of a large number of sprockets, guides, and rollers. It also increases the compactness of the machine permitting the exciting lamp to be placed just below the projection lamp instead of way down at the base of the machine as in sound-on-film projection machines heretofore used.

The two slightly braked rollers which cause the film to take an S turn around them and thereby utilizes the resiliency or the stiffness of the film itself to absorb any vibration from the constantly driven sprocket is very important as vibration from the moving parts of the machine has been one of the great problems in the reproduction of sound from film.

The fact that the drum is tapered very slightly is another important feature as it causes the film to ride against the shoulder and always holds it with its sound track in the path of the light beam, preventing any movement of the film off the drum which might cause the picture to cross the light beam and introduce undesirable sounds. Also the design of the inertia drum and the means of mounting it are factors in the efficient operation thereof as they permit free rotation without any possibility of vibration.

The spring pressed idler roller 126 is mounted on the arm 129 in such a way that the pulling of the film causes the roller to press more firmly against the drum and thereby prevents any slipping of the film at this point. Also the groove in this roller and in the other roller prevents any bumping of the rollers on the holes of the film and makes a much smoother operation of the device with less vibration.

The method of controlling the speed of the motor is also believed important as it works equally well with direct current or with alternating current. By adjusting the arm of the potentiometer the resistances of the two legs are varied so that practically constant speed may be obtained with substantially constant torque.

The automatic switch for closing and opening the picture gate and simultaneously shutting off and turning on the light sensitive cell and exciter lamp has a very important relation, not only to the operation of the apparatus, but to its size and weight, as it permits two projection machines to be operated with a single amplifier and speaker and without increasing the size of the converter (for direct current use) which may thus be made small enough to merely take care of one exciter lamp, only one being operated at a time. This automatic switch, either with the one machine or with two, also permits manipulation of the interior of the projection machine without affecting the light sensitive cell when the picture gate is closed so that undesirable sounds will not be made in the loud speaker during the time, for instance, when the film is being inserted.

Other features, such as the convenient arrangement of the cable connecters so that it is impossible to make a wrong plug connection and the machine may be connected up by an unskilled person without any danger to the electrical equipment and with the assurance that the machine will operate when the various cables have been connected, the valve on the water cell which permits expansion of the water when it is heated but prevents any leakage of water in transit, the light shutter which is held open by the cell and which closes automatically whenever the cell is withdrawn to prevent the light from the projection lamp from striking the film except through the water cell, also contribute to the unusual efficiency of the apparatus.

While the machine has been described in connection with a direct current source of supply alternating current may also be used in which case the converter will be eliminated and the plug 295b will be connected directly to the body 288 in the amplifier unit. For one who uses the apparatus in both alternating current and direct current districts it is necessary to carry a converter with the other equipment to be used when only direct current is available.

As described above the volume of the sound output of the loud speaker is regulated by the knob 287a mounted on the amplifier and the amplifier is therefore necessarily positioned adjacent the projection machine when the apparatus is in use so that the operator can regulate the volume during the performance. In fact this is the only reason why the amplifier is made removable from the speaker case. Where gas light sensitive cells are used it is necessary to have the leads from the cell to the amplifier as short as possible because the impedance of the cell is high but with the liquid cell mentioned above the amplifier might be placed at almost any distance away from the cell with equally good results.

A form of volume control which may be operated entirely independently of the amplifier unit permits the amplifier to be rigidly mounted in the speaker case which in some instances may be preferred. In Fig. 14 such a modified form of volume control is illustrated. Here the exciter lamp 116, optical system 123, and light sensitive cell 108, are positioned the same as has already been described. It is intended, however, to modify or change the intensity of the light from the exciter lamp to the light sensitive cell and this may be accomplished by means of a disc 310 of glass or other transparent material which is rotatably mounted on the pivot 311 eccentrically of the line through which the light passes the film on its way to the light sensitive cell. The disc 310 is preferably placed between the film and the cell as in this position it will interfere less with the concentration of the light on a single line of the film than where it is placed between the optical system and the film although it may also be positioned at such point. The disc may also be positioned between the exciter lamp and the optical system but it is the usual practice to have the exciter lamp so close to the optical system that it is inconvenient to place the disc here. The disc is graduated in transparency from a clear portion 312 at one side to a point 313 which is made densely cloudy with some suitable coloring matter. A stop lug 314 attached to the disc between the clear space and the cloudy space is adapted to engage a pin 315 as indicated so that the disc must be given a complete revolution in order to go from the clear space 312 to the cloudy space 313 or from the cloudy space back to the clear space. The graduation on the disc may be constant from the clear to the cloudy space or there may be arranged a plurality of sectors 316, each sector having a constant shading throughout its surface but being slightly more dense in degree than the sector preceding it. The disc may be provided with a serrated edge 317 by which it may be rotated in front of the light beam and when it is so rotated it will change the amount of light which falls upon the light sensitive cell. This in turn will change the input of the amplifier and hence will vary the sound output thereof. If desired the sectors 316 of the disc may be so arranged that in passing from one to another the difference in sound will be equal to one DB so that the change in sound when the disc is completely rotated will compare to the different steps on an ordinary fader used in sound-on-film work. The disc may be rotatably mounted on any convenient part of the apparatus where it may be reached by the operator.

A modified form of this volume control is illustrated in Fig. 15 where a rectangular strip 318 which may be formed of glass or other transparent material, such as film, is shown mounted in a suitable metal frame 319 which has a rack 320 at one side adapted to mesh with a gear 321. The gear 321 is provided with a suitable knob 322 which may be rotated to rotate the gear and move the strip backward and forward in front of the light beam which is indicated at 323. The strip may be graduated with a film of cloudy material similar to the graduations on the disc so that by moving the strip across the light beam the degree of light received by the light sensitive cell will be altered.

The amount of light received by the cell may also be controlled by an adjustable iris similar to those used in cameras for governing the size of the lens aperture.

Another form of controlling the volume of the loud speaker by controlling the input of the amplifier would be to provide a network-electrical system in the light sensitive cell output for attenuating the output without changing the impedance.

Many modifications of the invention may be used without departing from the spirit of the invention and I do not desire to limit myself to the exact construction shown and described except as such limitations occur in the appended claims. Other features of the invention are claimed in my co-pending divisional application Serial No. 125,370, entitled "Portable sound-on-film motion picture projecting apparatus", and filed February 12, 1937.

Having now described my invention what I desire to claim and secure by Letters Patent is:

1. In a device for reproducing sound from a sound track on a transparent film a rotatable drum, a shoulder on said drum, said shoulder being spaced from the edge of said drum a sufficient distance to permit the film to pass around the drum with the sound track overhanging the edge of said drum, said drum being slightly smaller in diameter at the edge thereof than at the base of said shoulder.

2. In a device for reproducing sound from a sound track on a transparent film a freely rotatable drum, a shoulder on said drum, said shoulder being spaced from the edge of said drum a sufficient distance to permit a film to pass around said drum with one edge adjacent said shoulder and the other edge carrying the sound track overhanging the edge of said drum and said drum being slightly less in diameter at the edge thereof than at the base of said shoulder, an exciter lamp positioned on one side of the film as it passes around said drum, a light sensitive cell positioned on the other side of said film from the exciter lamp, means to cause the sound track on said film to affect the light sensitive cell as said film passes a given point on the periphery of said drum, and means to draw said motion picture film over said drum.

3. In a device for reproducing sound from a sound track on a transparent film a freely rotatable drum, a shoulder on said drum spaced from the edge thereof a sufficient distance to permit a film to pass around said drum with its sound track overhanging the edge thereof, said drum being slightly less in diameter at the edge thereof than at the base of said shoulder, an exciter lamp, a light sensitive cell on the opposite side of said film from said exciter lamp as it passes around said drum, means to cause the sound track of said film to intercept light from said exciter lamp falling on said light sensitive cell so as to vary the output of said cell in accordance with the variations of said sound track, means to draw said film around said drum, said means being exerted upon one end of said film, and means to hold the other end of said film against said drum.

4. In a device for reproducing sound from a sound track on a ribbon a freely rotatable drum, a shoulder on said drum spaced from the edge thereof sufficiently to permit a ribbon to pass around said drum with one edge against said shoulder and with its sound track overhanging the edge of the drum, said drum being slightly less in diameter at the edge thereof than at the base of said shoulder, means acting only on one end of said ribbon to draw said ribbon around said drum, and means to hold the opposite end of said ribbon against said drum.

5. In a device for reproducing sound from a sound track on a ribbon a freely rotatable drum, means to draw a ribbon at a constant speed around said drum, said means acting on said ribbon at one point only after leaving said drum, means to hold said ribbon against said drum, and means whereby said ribbon is caused to bend in an arc of relatively small radius to cause the ribbon itself to absorb variations in the pulling force of said ribbon drawing means.

6. In a device for reproducing sound from a sound track on a motion picture film a freely rotatable drum, means to draw the film around said drum so that the sound track on the film overhangs the edge of said drum, an exciting lamp on one side of said film, a light sensitive cell on the other side of said film, means to modulate the light falling on said light sensitive cell from said exciter lamp by the sound track of said film as it passes a narrow line, and bodily non-movable means between said film drawing means and said drum and causing a plurality of opposite bends in said film about relatively short radii to absorb irregularities in the force supplied by said drawing means.

7. In a device for translating sound-on-film a freely rotatable drum, a shoulder on said drum spaced from the edge thereof sufficient to permit a film to have one edge adjacent said shoulder and its sound track overhanging the edge of said drum, the diameter of said drum at the edge thereof being slightly less than at the base of said shoulder, an exciting lamp positioned at one side of said drum, a light sensitive cell positioned at the opposite side of the film passing over said drum, means to modulate the light received upon said light sensitive cell by the sound track on said film crossing a narrow line, means to hold one end of said film against said drum, means to draw the other end of said film through said device thereby rotating said drum, and means between said film drawing means and said drum for absorbing irregularities in the pulling force of said film drawing means.

8. In a device for reproducing sound from a sound track on a motion picture film, a freely rotatable drum, means to draw the film around said drum so that the sound track on the film overhangs the edge of said drum, an exciting lamp on one side of said film, a light sensitive cell on the other side of said film, means to modulate the light falling on said light sensitive cell from said exciter lamp by the sound track of said film as it passes a narrow line, and means between said film-drawing means and said drum to absorb irregularities in the force supplied by said drawing means, said means comprising a roller positioned so that the film in passing over it will bend at an angle to the normal line of non-flexed movement into said film-drawing means.

9. In a device for reproducing sound from a sound track of a motion picture film having a composition resisting flexure, a freely rotatable drum, a constantly driven sprocket spaced from said drum and adapted to draw the motion picture film over said drum, and bodily non-movable shock-absorbing means between said constantly driven sprocket and said drum comprising a plurality of rollers positioned close together so that the film in passing over one and under the other will have to bend at an angle to the normal line of non-flexed movement into said film drawing means, and braking means on each roller to frictionally resist rotation thereof.

10. In a device for reproducing sound from a sound track on a motion picture film having a composition resisting flexure a freely rotatable drum, means to draw the film around said drum so that the sound track on the film overhangs the edge of said drum, an exciting lamp on one side of said film, a light-sensitive cell on the other side of said film, and bodily movable means between said film drawing means and said drum for bending said film.

11. In a system for reproducing sound from film including a light aperture and photocell, a rotatable pulley provided with a flange at one peripheral edge and being tapered slightly wider toward the flanged end, and a sound film interposed between said aperture and photocell and trained over said pulley, the sound track of said film being extended beyond the narrowed end of said pulley and in registration with said aperture.

12. In a system for reproducing sound from film including a light aperture and photocell, and a hollow rotatable pulley partially enclosing said photocell provided with a flange at one peripheral edge and being tapered slightly wider toward the flanged end, a sound film trained over said pulley having its sound track extended beyond the narrowed end of said pulley, said photocell, sound track and aperture being in registration one with the other.

ARNO ZILLGER.